United States Patent
Claessens et al.

(10) Patent No.: US 9,703,308 B2
(45) Date of Patent: Jul. 11, 2017

(54) METHOD FOR DISTRIBUTING AN ENERGY FLOW OVER A PREDETERMINED PERIOD OF TIME TO A CLUSTER OF A PLURALITY OF DEVICES TAKING INTO ACCOUNT CONSTRAINTS RELATING TO THE ENERGY TO BE DELIVERED TO THE DEVICES, A COMPUTER PROGRAM FOR PERFORMING SUCH A METHOD AND A SYSTEM THEREFOR

(75) Inventors: Bert Claessens, Spalbeek (BE); Maarten Hommelberg, Antwerpen (BE); Stijn Vandael, Zonhoven (BE)

(73) Assignees: VLAAMSE INSTELLING VOOR TECHNOLOGISCH ONDERZOEK (VITO), Mol (BE); KATHOLIEKE UNIVERSITEIT LEUVEN, Leuven (BE)

( * ) Notice: Subject to any disclaimer, the term of this patent is extended or adjusted under 35 U.S.C. 154(b) by 791 days.

(21) Appl. No.: 14/111,667

(22) PCT Filed: Dec. 23, 2011

(86) PCT No.: PCT/EP2011/074040
§ 371 (c)(1),
(2), (4) Date: Oct. 14, 2013

(87) PCT Pub. No.: WO2012/139670
PCT Pub. Date: Oct. 18, 2012

(65) Prior Publication Data
US 2014/0032007 A1    Jan. 30, 2014

(30) Foreign Application Priority Data
Apr. 15, 2011   (EP) .................... 11162735

(51) Int. Cl.
G05F 1/66    (2006.01)
G06Q 10/04   (2012.01)
G06Q 50/06   (2012.01)

(52) U.S. Cl.
CPC ............ *G05F 1/66* (2013.01); *G06Q 10/04* (2013.01); *G06Q 50/06* (2013.01); *Y02B 10/30* (2013.01)

(58) Field of Classification Search
CPC .......... G05F 1/66; G06Q 10/04; G06Q 50/06; Y02P 80/15; Y02B 10/30; Y02B 70/30;
(Continued)

(56) References Cited

U.S. PATENT DOCUMENTS 6,700,386 B2 * 3/2004 Egami ................ B60Q 11/00
307/10.1
8,131,403 B2 * 3/2012 Forbes, Jr. ............ G06Q 10/00
700/295

(Continued)

FOREIGN PATENT DOCUMENTS

JP    2005-102364 A    4/2005
JP    2005-245180 A    9/2005
(Continued)

OTHER PUBLICATIONS

European Summons to Attend Oral Proceedings dated Aug. 13, 2015, for EP 11811548.4.
(Continued)

*Primary Examiner* — M. N. Von Buhr
(74) *Attorney, Agent, or Firm* — Bacon & Thomas, PLLC

(57) ABSTRACT

Method for distributing an energy flow to a cluster of a plurality of devices taking into account constraints relating to the energy to be delivered to the devices, comprising the steps of: A. gathering flexibility information of the respective devices in the cluster, combining the flexibility infor-
(Continued)

mation of the devices of the cluster into flexibility information for the cluster, B. determining accumulated energy to be delivered in function of time over the predetermined period of time, C. supplying the determined accumulated energy to the cluster by obtaining, from the flow of energy, power in function of time based on the determined accumulated energy to be delivered in function of time, determining priority for power for all devices in the cluster and distributing the obtained power among the devices of the cluster.

17 Claims, 6 Drawing Sheets

(58) Field of Classification Search
CPC ......... Y02B 70/32; Y02E 10/70; Y02E 40/70; Y04S 10/10; Y04S 10/30; Y04S 10/54–10/60; Y04S 20/10; Y04S 20/20
USPC .................................. 700/286, 291, 296, 297
See application file for complete search history.

(56) References Cited

U.S. PATENT DOCUMENTS

| | | | | |
|---|---|---|---|---|
| 8,260,471 B2* | 9/2012 | Storch | ................... | G06Q 10/06 307/132 E |
| 8,335,595 B2* | 12/2012 | Tolnar | ...................... | H02J 3/14 700/286 |
| 8,375,229 B2* | 2/2013 | Saeki | ................... | G06F 1/3203 713/300 |
| 2004/0255171 A1* | 12/2004 | Zimmer | ................ | G06F 1/3203 713/300 |
| 2007/0300083 A1* | 12/2007 | Goodrum | .............. | G06F 1/3203 713/300 |
| 2008/0046387 A1 | 2/2008 | Gopal et al. | | |
| 2009/0132842 A1* | 5/2009 | Brey | ..................... | G06F 1/3203 713/322 |
| 2009/0228324 A1 | 9/2009 | Ambrosio et al. | | |
| 2009/0319090 A1 | 12/2009 | Dillon et al. | | |
| 2010/0324962 A1* | 12/2010 | Nesler | ................... | G05B 15/02 705/7.36 |
| 2012/0117390 A1* | 5/2012 | Arndt | ..................... | G06F 1/3203 713/300 |
| 2012/0130556 A1* | 5/2012 | Marhoefer | ................ | H02J 3/32 700/291 |
| 2014/0303795 A1* | 10/2014 | Hommelberg | ......... | G05B 15/02 700/286 |
| 2015/0280436 A1* | 10/2015 | Weckx | ................... | G06Q 50/06 700/295 |

FOREIGN PATENT DOCUMENTS

| | | |
|---|---|---|
| JP | 2010-81722 A | 4/2010 |
| WO | 2010/096506 A1 | 8/2010 |
| WO | 2011/014073 A2 | 2/2011 |

OTHER PUBLICATIONS

European Office Action dated Dec. 23, 2014, for EP 11811548.4.
Japanese Office Action dated Mar. 17, 2015, for JP 2014-504183, and English translation thereof.
International Search Report in PCT/EP2011/074040 (Mar. 1, 2012).
Written Opinion of the International Searching Authority in PCT/EP2011/074040 (Mar. 1, 2012).
Written Opinion of the International Preliminary Examining Authority in PCT/EP2011/074040 (Mar. 19, 2013).
Extended European Search Report dated Oct. 19, 2016, for EP 16171989.3.

* cited by examiner

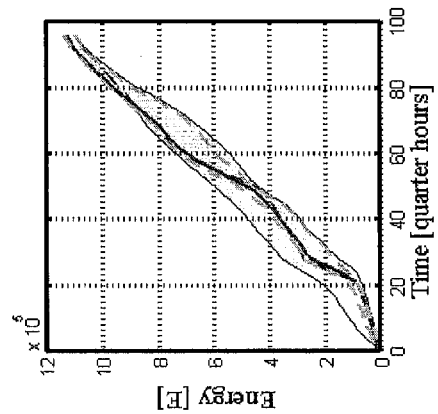
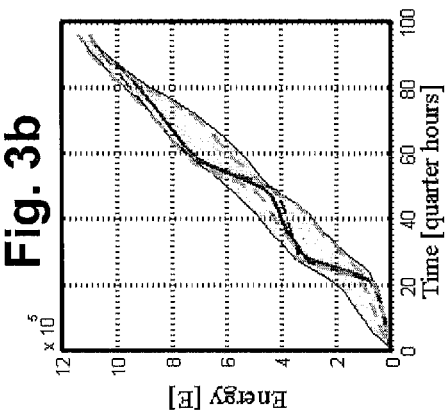
Fig. 3a
Fig. 3b
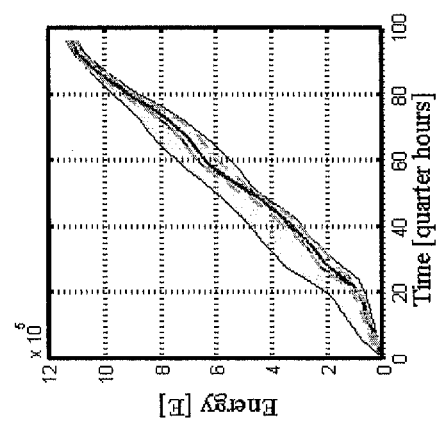
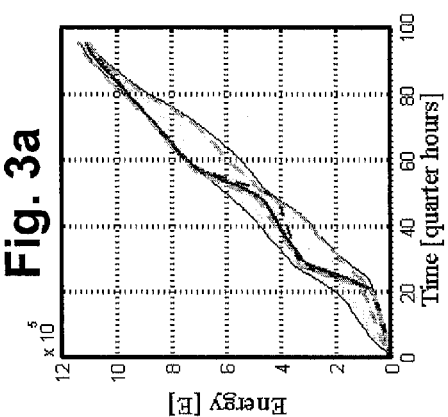
Fig. 3c
Fig. 3d

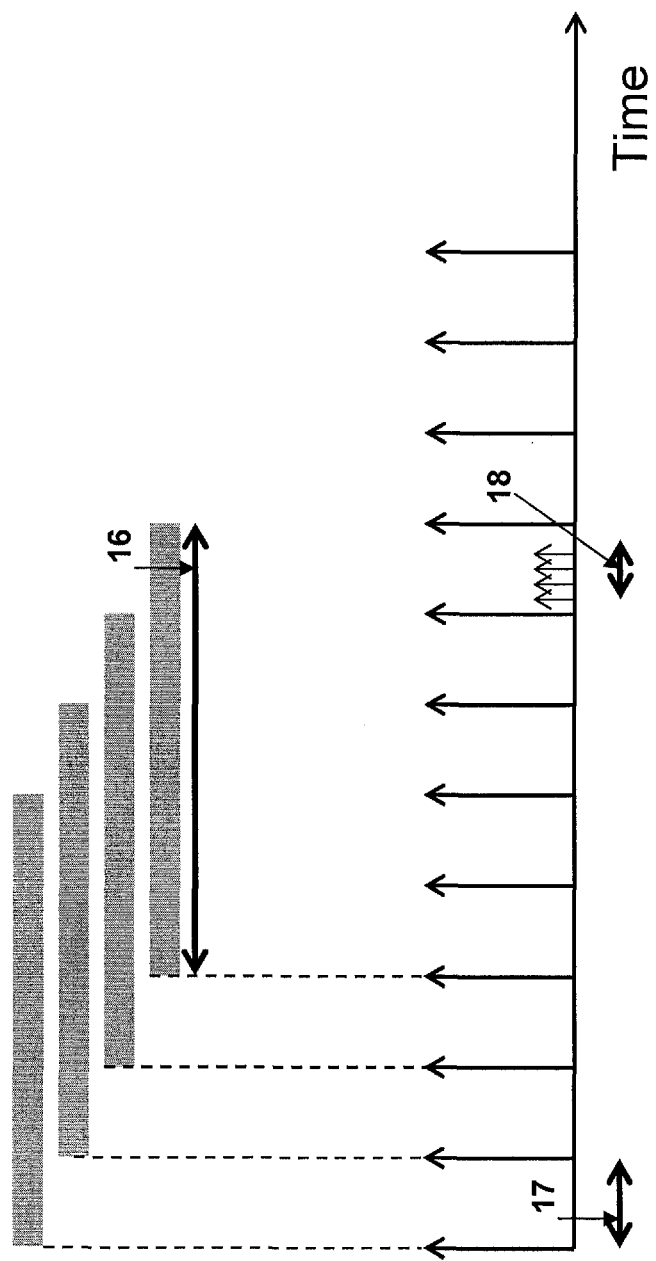

METHOD FOR DISTRIBUTING AN ENERGY FLOW OVER A PREDETERMINED PERIOD OF TIME TO A CLUSTER OF A PLURALITY OF DEVICES TAKING INTO ACCOUNT CONSTRAINTS RELATING TO THE ENERGY TO BE DELIVERED TO THE DEVICES, A COMPUTER PROGRAM FOR PERFORMING SUCH A METHOD AND A SYSTEM THEREFOR

BACKGROUND OF THE INVENTION

The current invention relates to a method for distributing an energy flow over a predetermined period of time to a cluster of a plurality of devices taking into account constraints relating to the energy to be delivered to the devices.

Methods for distributing an energy flow to a cluster of at least one device taking into account constraints relating to the energy, such as for example a price, to be delivered to the devices are already known to the person skilled in the art. US2009/0228324 for example describes a method for distributing an energy flow by aggregating marginal demand functions and determining an optimal allocation based on the aggregated function, i.e. an optimal allocation of energy to devices of the cluster taking the price of the energy into account as a constraint. For example, two or more marginal demand functions, respectively, from two or more devices of a cluster of devices, wherein a marginal demand function represents a price for a given amount of the energy flow that the devices are willing to pay are obtained and aggregated to form an aggregated marginal demand function. Further the optimal allocation of aggregate amounts of the energy flow to the two or more other devices based on the aggregated marginal demand function is determined. The aggregation operation for example is the sum of the individual utility values, however other examples such as a weighed sum are given.

However, although the method according to the state of the art tries to offer a decentralized solution such as to avoid scaling problems, only the allocation of energy to the different devices is taken care of without considering the flow of energy to the cluster devices in function of time such that, although a short-term, and/or local, advantage is obtained for the different devices of the cluster, it is possible that long-term, and/or more global, opportunities are being missed.

Although US20090319090 describes a method for distributing an energy flow over a predetermined period of time to a cluster of a plurality of devices taking into account constraints relating to the energy and taking into account a forecast with respect to availability of energy, US20090319090 describes a situation with a limited amount of devices in a cluster, i.e. a solar PV array, a load and an energy storage system for a building. However, when the number of devices in the cluster is increased, it will become increasingly difficult and sometimes even nearly impossible to distribute the flow of energy of the devices of the cluster using the methods described by US20090319090.

Moreover, US20090319090 does not describe how power to be supplied to the cluster, once obtained, is distributed, in function of time, among the devices of the cluster and therefore does not describe how devices having a more urgent need for energy are treated with respect to devices have a less urgent need for energy.

Although US2008/0046387 describes a method for distributing an energy flow over a predetermined period of time to a cluster of a plurality of devices taking into account the price of the energy and taking into account a forecast with respect to the price of the energy, it does not describe how power to be supplied to the cluster, once obtained, is distributed, in function of time, among the devices of the cluster and therefore does not describe how devices having a more urgent need for energy are treated with respect to devices have a less urgent need for energy. Therefore, it is an object of the current invention to provide a method for distributing an energy flow over a predetermined period of time to a cluster of a plurality of devices taking into account constraints relating to the energy to be delivered to the devices while avoiding missing long-term opportunities and taking into account the urgency with which the devices of the cluster require energy.

SUMMARY OF THE INVENTION

This is achieved according to the method for distributing an energy flow over a predetermined period of time to a cluster of a plurality of devices taking into account constraints relating to the energy to be delivered to the devices, comprises the steps of:

A. aggregating flexibility information for the cluster by gathering flexibility information of the respective devices in the cluster, the flexibility information of the respective devices comprising information on the energy already available to the respective devices, the minimal amount of accumulated energy in function of time needed and the maximal amount of accumulated energy in function of time allowed by the respective devices of the cluster within the predetermined period of time in function of time and the minimal and maximal amount of power intake allowed by the devices, and combining the gathered flexibility information of the respective devices of the cluster into aggregate flexibility information for the cluster, the aggregate flexibility information of the cluster comprising information on the energy already available to the cluster, the minimal amount of accumulated energy in function of time needed by the cluster and the maximal amount of accumulated energy in function of time allowed by the cluster, taking into account the minimal amount of accumulated energy in function of time needed and the maximal amount of accumulated energy in function of time allowed by the cluster by the at least one device within the predetermined period of time in function of time, within the predetermined period of time in function of time and on the minimal and maximal amount of power intake allowed by the cluster in function of time, taking into account the minimal and maximal amount of power intake allowed by the devices, B. determining accumulated energy to be delivered to the cluster in function of time over the predetermined period of time taking into account the aggregate flexibility information for the cluster, C. supplying the determined accumulated energy to the cluster by obtaining, from the flow of energy, power to be supplied to the cluster in function of time based on the determined accumulated energy to be delivered in function of time, determining for all devices in the cluster a priority for power to be supplied based on the flexibility information of the respective devices and distributing, in function of time, the supplied power among the devices of the cluster based on the priority for power to be supplied based on the flexibility information of the respective devices of the cluster.

It has been found that with such a method a more optimal distribution of an energy flow is obtained over the predetermined period of time taking into consideration the constraints relating to the energy to be delivered to the devices.

Moreover, the formation of clusters of several devices allows to significantly decentralize the control of the distribution of energy to the different devices such that scaling problems can be reduced.

Although by aggregating the devices into clusters of a plurality of devices information is inevitably lost, it has been found that by determining for all devices in the cluster a priority for power to be supplied based on the flexibility information of the respective devices nevertheless a distribution of the energy flow to the devices can be obtained such that the determined accumulated energy to be delivered to the cluster in function of time over the predetermined period of time taking into account the aggregate flexibility information for the cluster can be substantially respected and within the boundaries defined by the flexibility information of the respective devices.

This way a method is provided which allows considering the flow of energy to the cluster devices in function of time such as to avoid missing long-term opportunities and taking into account the urgency with which the devices of the cluster require energy while keeping the method scalable due to the use of the flexibility information and aggregating the flexibility information.

According to preferred embodiments of the current invention, the priority for power to be supplied based on the flexibility information of the respective devices for the respective devices is determined as power in function of priority such that minimal priority corresponds to the maximum amount of power intake allowed by the respective devices and the maximal priority corresponds to the minimum amount of power intake allowed by the respective devices. The respective relations between power and priority is indicative of the minimal amount of energy needed by the device in the predetermined amount of time and the relation between power and priority changing in function of time. It has been found that using such a mapping of the power in function of priority can be easily used to obtain priorities for the different devices for using the obtained power from the flow of energy. Moreover such a mapping of power in function of priority has been sufficient for determining how much power needs to be provided to the different devices, while substantially respecting the determined accumulated energy to be delivered to the cluster in function of time over the predetermined period of time taking into account the aggregate flexibility information for the cluster and within the boundaries defined by the flexibility information of the respective devices.

According to more preferred embodiment of the current invention, the respective priorities for power to be supplied to the respective devices are combined into an aggregate priority for power to be supplied, wherein, using the obtained aggregate priority for power to be supplied, the priority corresponding to the power obtained from the flow of energy is obtained for the cluster, after which, based on the obtained priority for the cluster, using the respective priorities for power to be supplied determined as power in function of priority for the respective devices, the power to be supplied for the respective devices is determined and distributed to the devices of the cluster. Such a distribution of power among the devices of the cluster has been found to allow a proper distribution of the power obtained taking the need for the power and the constraints into account such that, for example, devices requiring more power than other devices within the predetermined period of time can receive this power within the constraints relating to the energy and without substantially departing from the determined accumulated energy to be delivered to the cluster in function of time over the predetermined period of time taking into account the aggregate flexibility information for the cluster and within the boundaries defined by the flexibility information of the respective devices.

According to preferred embodiments of the current invention, the method is provided for distributing an energy flow over a first predetermined period of time to a cluster of a plurality of devices taking into account constraints relating to the energy to be delivered to the devices according to the method according to the present invention, wherein the steps A-C according to the present invention for distributing the energy flow are repeated every second predetermined period of time, wherein the second period of time is smaller than the first predetermined period of time. Using such an algorithm, it has been found that the benefits of a long term optimization of an energy flow to the cluster of devices is combined with taking into account changes over a shorter term in the constraints relating to the energy and the flexibility information of the devices of the cluster. This way, for example an optimization of an energy flow to a cluster of devices can take into account long term effects such as for example change in constraints over an extended period of time, such as for example periodic changes in the price of the energy related to, for example, the time of use of the energy such as for example the price of energy, such as electricity, by day and by night due to the availability of the energy during these moments, as well as short term effects such as for example a change in constraints over a limited period of time such as for example a sudden and unexpected change in price of the energy, such as for example electricity due to a sudden surge in availability of the energy, for example due to a sudden surge of wind energy due to whether circumstances.

According to preferred embodiments of the current invention, combining the flexibility information of the at least one device of the cluster into flexibility information for the cluster comprises adding the minimal amounts of accumulated energy in function of time needed by the respective devices, adding the maximal amounts of accumulated energy in function of time allowed by the respective devices, adding the minimal amount of power in function of time of the respective devices and adding the maximal amount of power in function of time of the respective devices. Such a method, although being relatively simple to perform, nevertheless has been found sufficient to provide an optimized distribution of the flow of energy to the devices of the cluster.

According to preferred embodiments of the current invention, the steps are carried out by a computer. Such a computer allows to regulate the flow of energy substantially without any human interference.

According to preferred embodiments of the current invention, the flexibility information is stored in at least one of the devices of the cluster and step A comprises sending the flexibility information to the computer. This allows that upon connection of such a device to the cluster, the computer can update the flexibility information of the cluster depending on the flexibility information of the device, for example but not necessarily after the second predetermined period of time has lapsed.

According to preferred embodiments of the current invention, the flexibility information of at least one of the devices of the cluster is obtained by monitoring use of energy in function of time of the at least one device. Such an embodiment allows to determine the flexibility information of a device of the cluster without the device having to store the flexibility information itself such that, for example, devices not being especially adapted to communicate with the computer, such as for example older home appliances such as older cloths driers, washing machines, dishwashers, battery chargers, etc., can operate with the method according to the invention.

Preferably, the flexibility information of at least one of the devices of the cluster is obtained with a Markov process. Other methods are however also possible such as for example neural network, ARMA (auto regressed moving average), etc.

According to preferred embodiments of the current invention, the constraints relating to energy comprise the availability of the energy. In such an embodiment the demand for energy by the devices, grouped in clusters, can be balanced with the supply of energy and it has been found that a more continuous flow of energy can be obtained which is important for, for example, electricity. The constraints relating to energy can also comprise, instead or in addition, any one of: the desired frequency and/or voltage of electricity on a power grid for stabilizing the flow of electric energy on the power grid the power grid being in such case the flow of energy, environmental factors relating to the flow of energy such that environmental factors can be taken into account, etc.

According to preferred embodiments of the current invention, the constraints relating to energy comprise the price of the energy. In such an embodiment the price paid for the energy can be minimized such that the users of the devices pay less for a same amount of energy. Such a method is especially preferred in combination with constraints relating to energy comprise the availability of the energy as the price for energy usually is correlated to the amount of available energy, especially with electrical energy.

According to preferred embodiments of the current invention, the energy is electrical energy as for such energy the constraints can vary significantly over time.

According to preferred embodiments of the current invention, the determination of the energy to be delivered in function of time over the predetermined period of time is done using any one of linear programming and stochastic, preferably dynamic, programming. Other methods are however possible such as for example A*, dynamic programming such as approximate or neuro dynamic programming, reinforcement learning, etc.

According to preferred embodiments of the current invention, the priority for power to be supplied for the respective devices is determined after a third predetermined period of time. It has been found that with such an embodiment, priority for power determined as power in function of priority in function of time can be taken into account. Preferably, the third predetermined period of time is smaller than the second period of time. According to preferred embodiments of the current invention, a device requesting an amount of power at maximal priority is provided with that amount of power from the flow of energy Such a method allows that immediate requests for power, such as for example when a light is switched on, can be satisfied. Especially in combination with embodiments in which the steps for distributing the energy flow are repeated every second predetermined period of time, it has been found that although a device with such an immediate request for power is present in the cluster, this need can be incorporated into a next cycle of the steps such that the accumulated energy in function of time determined can be adapted to such requests such that an optimized energy flow to the devices of the cluster taking into account the constraints relating to the energy can nevertheless be obtained.

The invention also relates to a computer program in a computer readable format, comprising the software components for performing the method according to the invention.

The invention also relates to a system for distributing an energy flow over a predetermined period of time to a cluster of a plurality of devices of the system, taking into account constraints relating to the energy to be delivered to the devices wherein the system comprises an aggregator provided to perform the steps A, B and C of the method according to the invention.

According to preferred embodiments of the system according to the current invention for distributing an energy flow over a predetermined period of time to a cluster of a plurality of devices of the system, taking into account constraints relating to the energy to be delivered to the devices wherein the aggregator provided to perform the steps A, B and C of the method according to the invention, is a computer.

BRIEF DESCRIPTION OF THE DRAWINGS

The invention will be further elucidated by means of the following description and the appended figures.

FIG. 3 illustrates another preferred embodiment of the method according to the invention.

FIG. 4 shows a graphical representation of a preferred embodiment of the method according to the invention.

DETAILED DESCRIPTION OF THE INVENTION

Figure 1:
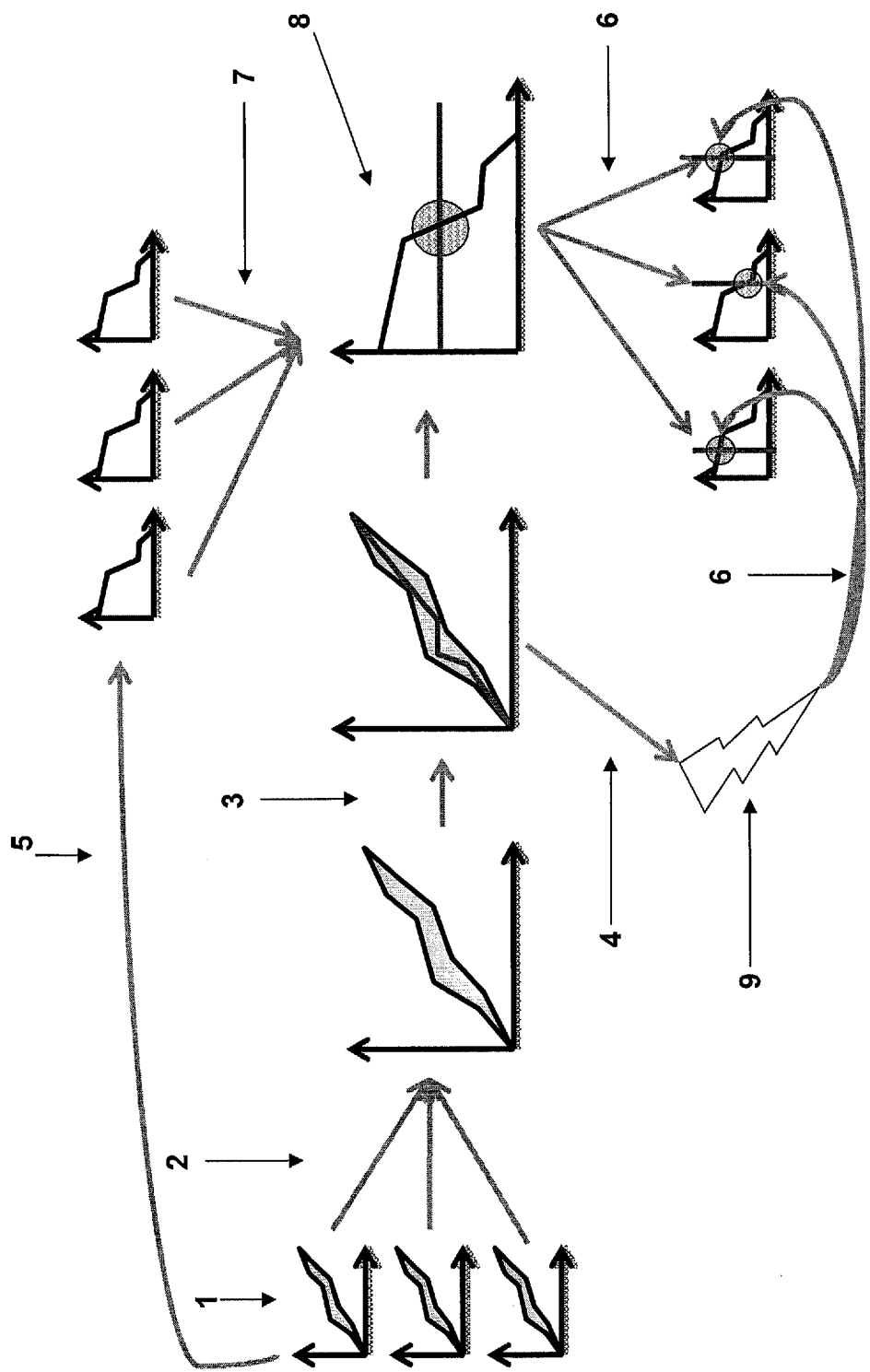
FIG. 1 shows a graphical representation of a preferred embodiment of the method according to the invention.

In the following detailed description, numerous specific details are set forth in order to provide a thorough understanding of the invention and how it may be practiced in particular embodiments. However, it will be understood that the present invention may be practiced without these specific details. In other instances, well-known methods, procedures and techniques have not been described in detail, so as not to obscure the present invention. While the present invention will be described with respect to particular embodiments and with reference to certain drawings, the invention is not limited hereto. The drawings included and described herein are schematic and are not limiting the scope of the invention. It is also noted that in the drawings, the size of some elements may be exaggerated and, therefore, not drawn to scale for illustrative purposes.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

FIG. 1 shows a graphical representation of a preferred embodiment of the method according to the invention.

The method relates to distributing an energy flow over a predetermined period of time to a cluster of a plurality of devices taking into account constraints relating to the energy to be delivered to the devices.

The flow of energy can be any flow of energy deemed appropriate by the person skilled in the art but preferably is a flow of electric energy, more preferably over a smart grid using demand side management (DSM). This is however not critical for the invention and the flow of energy can also be a flow of heat such as to distribute the heat over different heat exchangers, such as for example radiators, such that the generated heat for example can be optimally distributed over, for example, different rooms of a building. However, additional examples are where the flow of energy is a flow of a natural resource which can generate energy such as for example oil, gas, solid combustible materials such as for example wood, paper, etc.

The cluster can comprise many different devices or can comprise substantially one sort of device. For example, the cluster can group together the devices of a household, different households of for example a block of houses, etc. the cluster in such case grouping together household devices. The cluster however can also group together devices such as for example electric cars, electric heaters, etc. Although the cluster can group together similar devices into a cluster it can also comprise several substantially different devices such as for example industrial devices with substantially different energy requirements.

Although many of the examples of the devices given above are devices which need energy to provide work, the cluster can also comprise devices which provide energy from work, i.e. devices producing energy such as for example wind turbines, combined heat and power devices, photovoltaic electrical energy devices, etc. For such devices the power has an opposing sign as the power for devices which need energy to work such that minimal and maximal amount of power intake allowed by the devices can also be worded as the minimal and maximal amount of power, with opposing sign as previously mentioned, output.

Any number of devices can be grouped into a cluster of devices such as for example two devices, three devices, four devices, five devices, six devices, etc. depending on the requirements of the person skilled in the art. However, preferably the minimum amount of devices of the cluster is 20, although the method is suitable for handling large numbers of devices in a cluster such as for example 100 000 or more. However, when increasing the amount of devices, the time needed to perform certain steps such as for example step 2 increases, more in particular linearly. Therefore, it is preferred that the number of devices grouped in a cluster does not excessively increases the time needed for certain steps of the method according to the invention.

The cluster of devices comprises devices actually connected to the flow of energy and/or comprises devices which during the predetermined time are initially not connected to the flow of energy but are connected to the flow of energy during the predetermined period of time. The cluster can for example comprise a group of electrical cars to be charged some of which are connected to the flow of energy at the beginning of the predetermined period of time, others connected to the flow of energy during the predetermined period of time, for example in a garage upon arrival.

The predetermined period of time, also called the first predetermined period of time, can be any period of time practically usable by the person skilled in the art for the method according to the invention. However, as the energy flow to devices in general is related to its users, being in general humans, the energy flow in general has a periodicity of a day, 24 hours, such that the preferred predetermined period of time is 24 hours. This is however not critical for the invention and also other periods of time can be used by the person skilled in the art such as for example a manifold of 24 hours, or 12 hours or a manifold of 12 hours, all relating to the general cycle in time in the flow of energy due to the users in general of the flow of energy. Also the predetermined period of time can be a week or a month, also keeping track of other cycles such as weekends, etc. The period of time can also be determined keeping in mind the nature of the cluster. For example, the previously mentioned clusters are especially preferred if applied to clusters with substantially domestic appliances such as washers, dryers, dishwashers, etc. However, the predetermined period of time can also be in function of a general working day, such as for example 8 hours, when the cluster for example groups together devices used in a working environment such as for example computers (office environment), heavy machinery (industrial environment), etc. According to another example the devices are cars and the cluster groups together cars to be charged, for example in a garage for electrical cars with charging stations. In such an example the predetermined period of time is adapted to the general stationary time of a car depending on for example the reason why people station their car in the garage such as for example shopping, working, etc.

Figure 2:
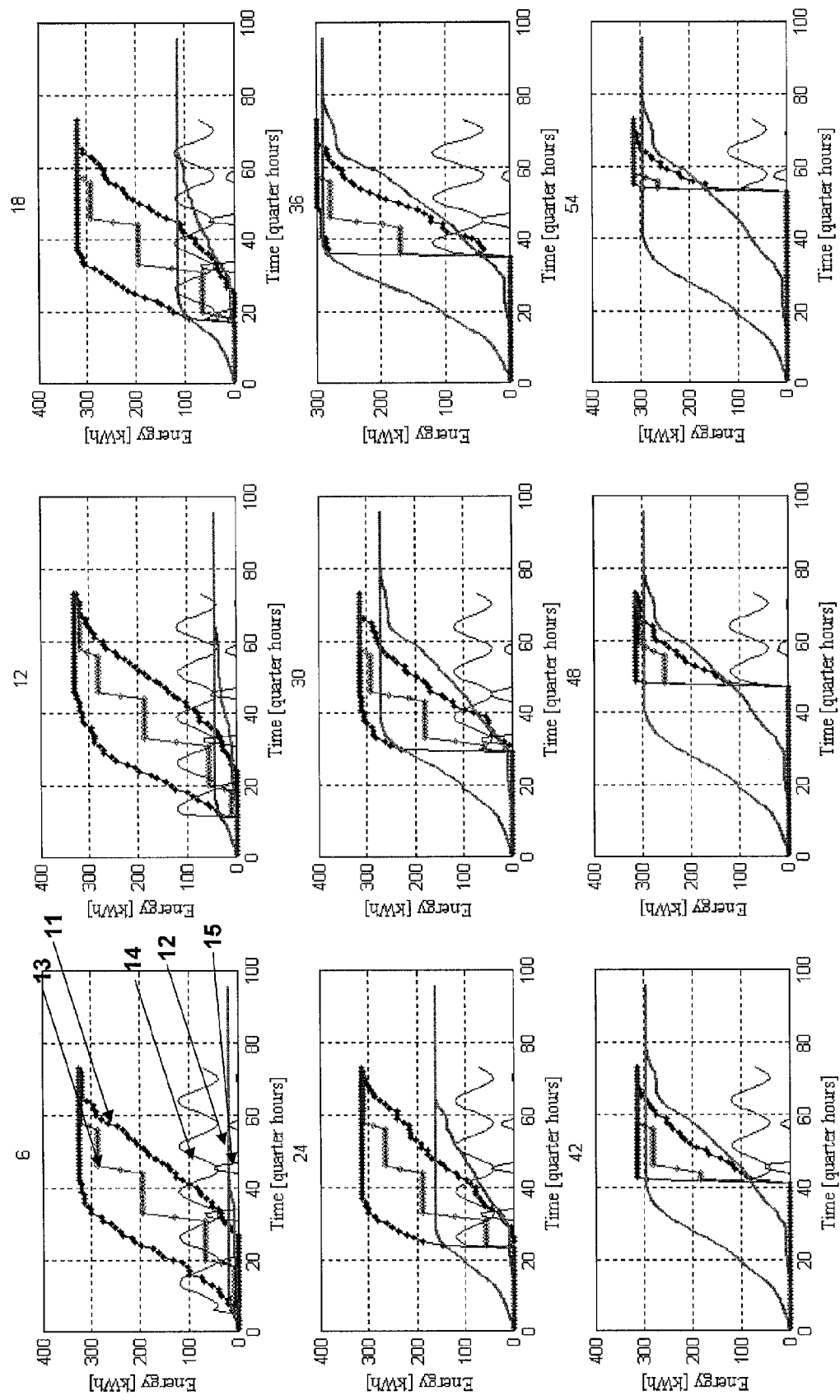
FIG. 2 illustrates a preferred embodiment of the method according to the invention in function of time.

FIGS. 2 and 3 for example show a predetermined time of 96 quarters of an hour, being 24 hours or a day.

The constraints can be any constraints, such as for example availability, price of the energy, the availability possibly being reflected in the price of the energy, the maximum amount of energy which can flow over a certain connection from the devices of the cluster to the flow of energy, for example for electrical energy taking for example the occurrence of an overcurrent into account, a maximal power which can be delivered to the cluster, for example if the flow of energy if delivered to the cluster over an electrical transformator, etc.

Preferably, the method according to the invention is performed by a computer, in the context of this application called the aggregator. The different devices are interconnected to the computer over, for example, a LAN, for example using an intranet, or a WAN, for example using the internet. Although possible, it is not necessary for the different devices of the cluster to be directly interconnected using a LAN.

It is also not required that the respective devices of the cluster are as a group interconnected to the flow of energy using a single line for providing the flow of energy to the different devices of the cluster, such as for example often in a single household, each respective device can be connected to the flow of energy independently from the other devices.

Figure 5:
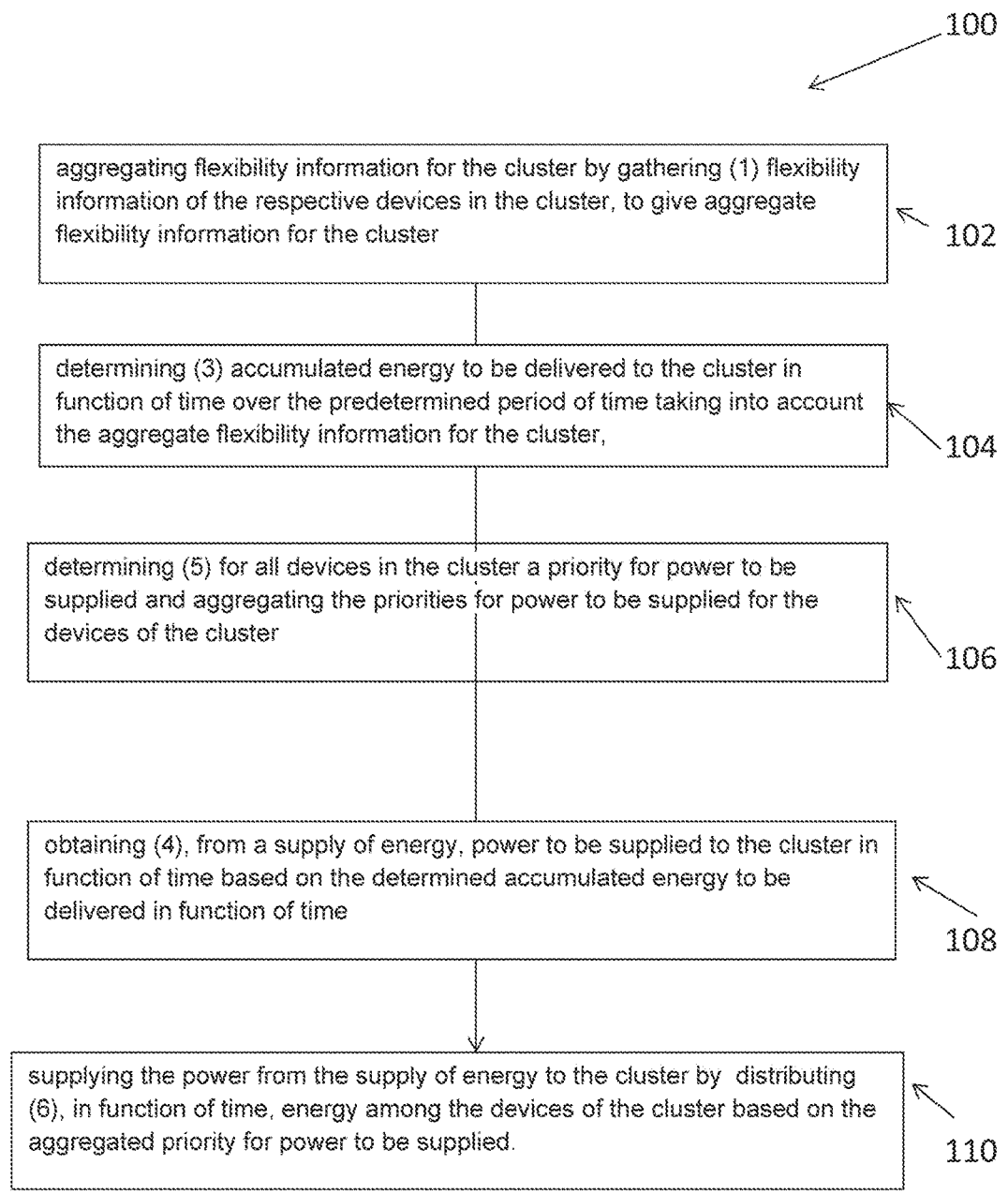
FIG. 5 illustrates a flow diagram of the method according to the invention.

According to the invention in a first step A, as seen in step 102 of FIG. 5, the flexibility information of the respective devices in the cluster is gathered, preferably by the aggregator. The flexibility information of the respective devices comprises information on the energy already available to the device, the minimal amount of accumulated energy in function of time needed and the maximal amount of accumulated energy in function of time allowed by the respective devices of the cluster within the predetermined period of time in function of time and the minimal and maximal amount of power intake allowed by the device.

The flexibility information is graphically shown as flexibility curves for the respective devices in FIG. 1 as respective areas for the respective devices in diagrams of which the X-axis represents time and the Y-axis represents energy accumulated by the respective devices. The area is delimited by two curves representing the minimal amount of accumulated energy in function of time needed and the maximal amount of accumulated energy In function of time allowed by the respective device. The slope of the curves in the diagrams of FIG. 1 indicates the minimum and maximum amount of power intake allowed by the respective devices.

The gathering 1 of the flexibility information of the devices by the aggregator for example comprises the different devices sending their respective flexibility information to the aggregator which gathers the flexibility information of the respective devices.

The flexibility information is for example stored in at least one of the devices of the cluster and step A comprises sending the flexibility information to the computer. For example, the devices comprise a memory, for example programmed in the production facility of the device, in which the flexibility data is stored.

The flexibility information of at least one of the devices of the cluster can also be obtained by monitoring use of energy in function of time of the at least one device. This information can for example be monitored by the aggregator such that the aggregator obtains the flexibility information from the devices, or can be monitored by the device itself, by for example a processor present in the device after which the resulting flexibility information is for example stored in the device and/or send to aggregator.

Figure 6:
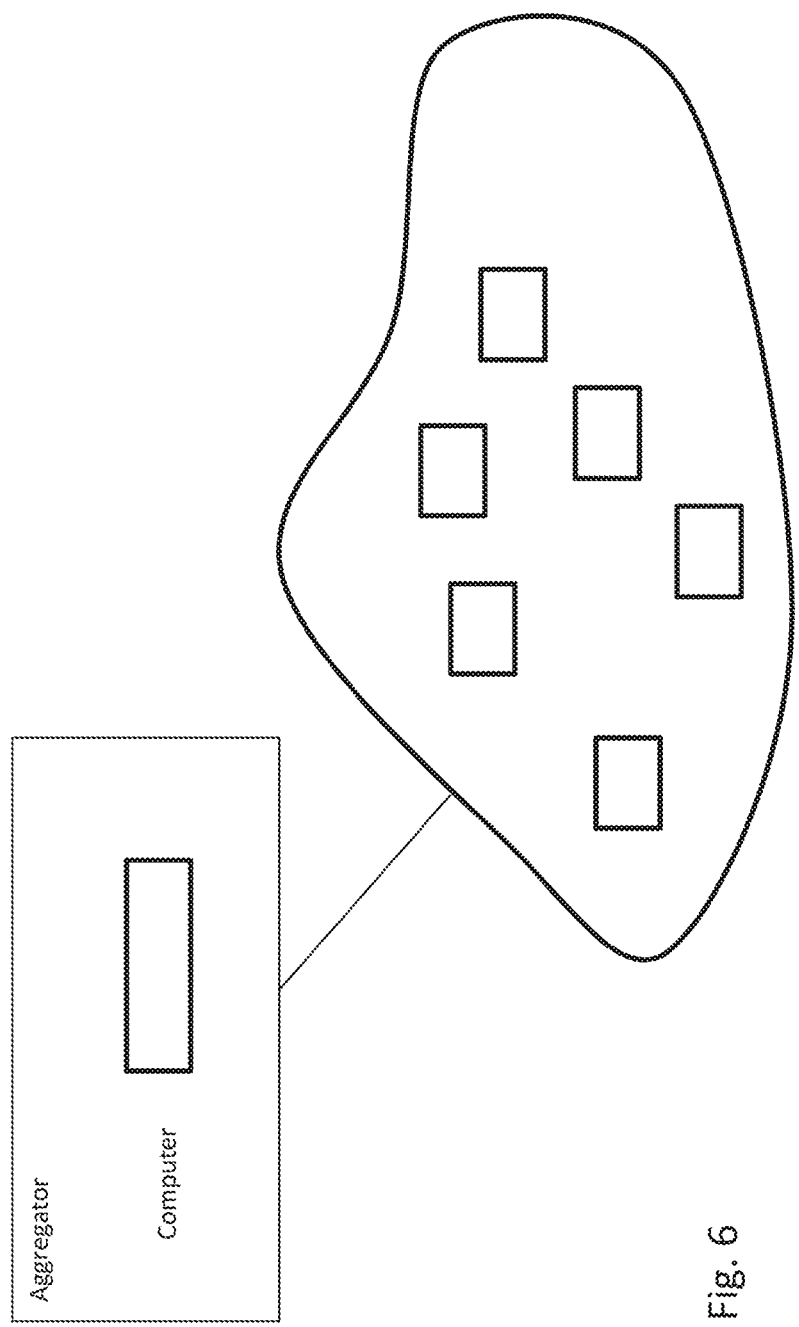
FIG. 6 shows a system for carrying out the invention.

In a next step, the flexibility information of the at least one device of the cluster is combined, preferably by the aggregator, for example, as seen in the aggregator of FIG. 6, into aggregated flexibility information for the cluster. The flexibility information of the cluster comprises information on the energy already available to the cluster, such as to avoid accumulation of too much energy. Further, the flexibility information comprises the minimal amount of accumulated energy in function of time needed and the maximal amount of accumulated energy in function of time allowed by the cluster, taking into account the minimal amount of accumulated energy in function of time needed and the maximal amount of accumulated energy in function of time allowed by the at least one device within the predetermined period of time in function of time, within the predetermined period of time in function of time. Moreover, the flexibility information of the cluster comprises the minimal and maximal amount of power intake allowed by the cluster in function of time, taking into account the minimal and maximal amount of power intake allowed by the at least one device.

This step is for example illustrated in FIG. 1 in which the different flexibility curves for the respective devices are combined into a single area for the cluster in a diagram of which the X-axis represents time and the Y-axis represents energy accumulated by the cluster, called a flexibility curve for the cluster. The area is delimited by two curves representing the minimal amount of accumulated energy in function of time needed and the maximal amount of accumulated energy in function of time allowed by the cluster. The slope of the curves in the diagrams of FIG. 1 indicates the minimum and maximum amount of power intake allowed by the cluster.

Preferably, combining the flexibility information of the at least one device of the cluster into aggregate flexibility information for the cluster comprises adding the minimal amounts of accumulated energy in function of time needed by the respective devices, adding the maximal amounts of accumulated energy in function of time allowed by the respective devices, adding the minimal amount of power in function of time of the respective devices and adding the maximal amount of power in function of time of the respective devices. This is however, not critical for the invention and combining the flexibility information of the at least one device of the cluster into flexibility information for the cluster can also be done by, for example, convolution.

Subsequently, as seen in step 104 of FIG. 5, accumulated energy to be delivered to the cluster in function of time is determined 3, preferably by the aggregator, over the predetermined period of time, preferably such that the minimal amount of accumulated energy in function of time needed by the cluster is fulfilled, taking into account the aggregate flexibility information for the cluster, such as for example minimal and maximal amount of power intake allowed by the cluster and the constraints relating to the energy to be delivered to the devices.

This step 3 is for example illustrated in FIG. 1. FIG. 1 shows that the determined accumulated energy in function of time can be represented as a curve in between the minimal amount of accumulated energy in function of time needed and the maximal amount of accumulated energy in function of time allowed by the cluster.

Preferably, the determination of the energy to be delivered in function of time over the predetermined period of time is done using any one of linear programming and stochastic, preferably dynamic, programming.

The objective of this step is to schedule the charging of the cluster by finding the best path through the aggregate flexibility information for the cluster. This problem can for example be considered as a shortest path problem and thus different cost functions can for example easily be integrated in the scheduling model. To solve this shortest path problem, the aggregate flexibility information for the cluster, represented in FIG. 1 as a flexibility graph, is discretized in "energy states" $E_t$. Each energy state $E_t$ preferably represents an amount of energy E off-taken by the cluster after time t. In each energy state $E_t$, a finite set of charge actions $\Gamma(E_t)$ is possible. Each charge action $a_t$ will cause an energy transition from the energy state $E_t$ to a new energy state $E_{t+1}$. The transition from $E_t$ to $E_{t+1}$ through an action $a_t$ which is an element of $\Gamma(E_t)$ is defined by the function $E_{t+1}=T(E_t, a_t)$. For all t which are elements of $\Gamma(E_t)$, the following constraints preferably hold:

$$E_{t+1}-E_t \geq 0$$

$$E_{t+1}-E_t \leq P_t \cdot \Delta t$$

$$E_{t+1} < E^{max}_t$$

$$E_{t+1} \geq E^{min}_t$$

The first constraint dictates that an energy transition should always be positive. In some cases, this constraint can be relaxed, for example when the situation allows devices to be charged, such as for example cars, more in particular electrical cars such as for example hybrid cars, to give energy to the flow of energy, being for example the electrical grid to which they are connected, a situation also known as V2G (Vehicle to Grid). The second constraint is a grid constraint that limits the power to $P_t$ according to grid specifications. Finally, the third and the fourth constraints ensure energy states are within limits of the energy flexibility graph.

The cost of an action $a_t$ is for example defined by the considered business case through the objective function $F(E_t, a_t)$. Because the decision problem starts in state $E_0$ and ends in the state $E_{end}$, the complete objective function to be minimized is preferably defined as the sum of all values $F(E_t, a_t)$ running from t=0 to $t_{dep}$.

A known solution method for shortest path decision problems indeed is DP (Dynamic Programming). In general, DP is acquired to solve problems which can be broken down in a set of overlapping subproblems. In order to reduce computation time, DP solves each subproblem only once. The Bellman equation in DP for example defines the solution to these subproblems as a recursive function V. In terms of the best path through the flexibility graph, the Bellman equation is defined as:

$$V(E_t)=\min_{a_t}\{F(E_t,a_t)+V(E_{t+1})\}$$

The result of solving this equation is a sequence of actions which minimizes the objective function. In terms of our problem, where an action is charging energy, this sequence of action is a charge plan $\vec{E}_{t_\Delta}$ for the entire fleet:

$$\vec{E}_{t_\Delta}=\{E_1 E_2 E_3 \ldots E_T\}$$

In addition, when for example the flexibility data of the devices is not stored, the energy to be delivered in function of time over the predetermined period of time is determined using reinforced learning. Such a process is for example illustrated in FIG. 3 wherein the energy to be delivered in function of time over the predetermined period of time determined by reinforced learning is illustrated after day 1 (FIG. 3a), day 2 (FIG. 3b), day three (FIG. 3c) and day four (FIG. 3d). The energy to be delivered in function of time over the predetermined period of time is indicated in the area delimited by the minimum amount of accumulated energy needed and the maximum amount of accumulated energy allowed by the cluster in function of time as a solid line. The minimum and maximum values reached over the four days by the determined energy to be delivered in function of time over the predetermined period of time are indicated as dashed lines. It can be observed that the minimum and maximum values reached over the four days by the determined energy to be delivered in function of time over the predetermined period of time become closer to the minimum amount of accumulated energy needed and the maximum amount of accumulated energy allowed by the cluster in function of time, meaning that the determined energy to be delivered in function of time over the predetermined period of time is obtained using information from a larger part of the area delimited by the minimum amount of accumulated energy needed and the maximum amount of accumulated energy allowed by the cluster in function of time such that a more optimal determined energy to be delivered in function of time over the predetermined period of time is obtained.

In a next step C the determined accumulated energy to the cluster is supplied to the cluster by obtaining 4, as seen in step 108 of FIG. 5, from the flow of energy, power to be supplied to the cluster in function of time based on the determined accumulated energy. The energy is for example obtained in an online auction for the electricity using known bidding schemes on the basis of the determined accumulated energy for the cluster and the related power needed for the cluster. The bid is also illustrated in FIG. 1 as an arrow pointing to the auction place 9, often a virtual auction place. The supply of the obtained power to the cluster is explained further.

In subsequent step 5 priority for power to be supplied for all devices in the cluster is determined based on the flexibility information of the respective devices, as seen in step 106 of FIG. 5. This is for example shown in FIG. 1, wherein, based on the flexibility curves of the devices, the priority for power, more in particular determined as power in function of priority, for all devices in the cluster is determined, illustrated as power priority curves for the devices.

This step can be performed by the respective devices of the cluster using their respective flexibility information or by the accumulator using the gathered flexibility information.

The priority for power in function of priority for the respective devices preferably is determined such that minimal priority corresponds to the maximum amount of power intake for the respective devices and the maximal priority corresponds to the minimum amount of power intake allowed by the respective devices, the respective relations between power and priority being indicative of the minimal amount of energy needed by the devices in the predetermined amount of time and the relation between power and priority changing in function of time. This is for example illustrated in FIG. 1.

The priory for power to be supplied, preferably in function of priority, are respectively determined such that the minimum amount of accumulated energy needed and the maximum amount of accumulated energy allowed by the devices in function of time are not exceeded while respecting limitations respectively imposed by the maximum and minimum power intake allowed by the device in function of time. Consequently, the priority for power to be supplied also varies in function of time. Examples of such priority for power determined as power in function of priority of the respective devices are for example shown in FIG. 1.

More preferably, the respective priority for power for the respective devices are combined 7, preferably by the accumulator, into an aggregate priority for power to be supplied for the cluster, illustrated in FIG. 1 as a power priority curve for the cluster.

Hereafter, using the obtained aggregate power in function of priority for the cluster, the priority corresponding to the power obtained from the flow of energy is obtained for the cluster, after which, based on the obtained priority for the cluster, using the respective priorities for power to be supplied in function of priority for the respective devices, the priority for power to be supplied for the respective devices is determined 10 and distributed 6 to the devices of the cluster, as seen in step 110 of FIG. 5. Although this can be centrally done by the aggregator, the priority can also be distributed 6 to the devices as shown in FIG. 1, each respective device determining the power corresponding to the priority determined for the cluster, using the previously obtained priority for power determined as power in function of priority, and each device obtaining the determined power from the flow of energy.

This last step is for example illustrated in FIG. 1, wherein the priority obtained for the cluster has been indicated in three power priority curves for three devices of the cluster, the same priority giving rise to a different priority for power for the respective devices. This power is subsequently obtained by the devices from the flow of energy, for example, using a switch to allow electricity. This is illustrated in FIG. 1 by arrows 6 indicating the distribution of the power obtained. In particular, preferably, devices with a priority for power which is lower then the priority obtained for the cluster will draw power at most at the minimal power, while devices with a priority for power which is greater than the priority obtained for the cluster will draw power at a charging power between $p_{min}$ and $p_{max}$.

Obtaining 8 the priority corresponding to the power obtained from the flow of energy for the cluster is illustrated in FIG. 1 in which it is shown that the priority can be determined by determining the intersection of a curve representing the priority for power determined as power in function of priority for the cluster and a curve representing the slope of the determined accumulated amount of energy. It can be seen that the curve representing the slope of the determined accumulated amount of energy is substantially horizontal with the axis representing priority. This is however not critical for the energy and the curve representing the slope of the determined accumulated amount of energy can also be sloped. Preferably, the priority to use the obtained power from the energy flow is determined by subtracting the aggregate power in function of priority from the power obtained from the flow of energy in function of priority and determining from the resulting power in function of priority the priority with a power substantially closest to zero. Such a distribution of the supplied power is however not critical for the invention and other distribution schemes are possible.

Preferably, for the respective devices the priority corresponding to the power obtained from the flow of energy is further obtained, using the priority for power determined as power in function of priority for the respective devices, after which the obtained power from the flow of energy is distributed to the respective devices based on the obtained priorities for the respective devices.

Preferably, although not illustrated in the figures, a device requesting an amount of power at maximal priority is provided with that amount of power from the flow of energy.

FIG. 2 shows an example of the evolution of the accumulated energy by a cluster in function of time using the method according to the current invention.

The different figures as indicated have time on their X-axes (indicated in quarter of hours) and accumulated energy (indicated in kWh) on their Y-axes and show different curves:

A first curve 11 represents the flexibility information of the cluster.
A second curve 12 representing the flexibility information of the cluster excluding the flexibility information of the devices not yet connected to the flow of energy. In other words, the first curve 10 includes future information, for example based on predictions based on data of previous events, whereas the second curve 11 only includes current information.

A third curve 13 represents the determined accumulated energy in function of time for the cluster, illustrated by the first curve 11.

A fourth curve 14 represents the constraints in function of time

A fifth curve 15 represents the power in function of time corresponding to the determined accumulated energy, however for this function the Y-axis is no longer energy indicated in kWh but instead Power. The fifth curve 15 is merely given for illustrative purposes.

In the case illustrated, the method according to the current invention is used to optimize an energy flow over a first predetermined period of time 16, in this case being 24 hours or 96 quarters of an hour, to a cluster of a plurality of devices taking into account constraints relating to the energy to be delivered to the devices, wherein the steps according to the invention are performed repeatedly every second predetermined period of time 17, being 6 quarters of an hour, wherein the second period of time 17 is smaller than the first predetermined period of time 16. As can be seen in the figures such a cycling of the method according to the invention allows changing the determined accumulated energy in function of time depending on constraints and flexibility information of the devices both changing in time.

Moreover, the priority for power to be supplied for the respective devices is determined after a third predetermined period of time 18, which is indicated with the dots on the determined accumulated energy in function of time. The third predetermined period of time 18 being for example a minute, a few minutes or even less, for example a few seconds or even a second. This allows that the priority corresponding to the power obtained from the flow of energy is obtained for the cluster which is used to obtain the power which can be obtained by the devices from the flow of energy can be regularly updated, such that the power to be obtained from the flow of energy can be obtained regularly and such that changes, such as new devices added to the cluster, can be taken care of. Therefore, preferably, the third predetermined period of time 18 is smaller than the second predetermined period of time 17.

For example, when a new device is added to the cluster within a second period of time 17, the determined accumulated energy to be delivered to the cluster in function of time over the predetermined first period of time 16 will not alter since the second period of time 17 has net yet come to an end and therefore the newly added device will not yet be taken into account for the determined accumulated energy to be delivered to the cluster in function of time over the predetermined first period of time. However, as the third period of time 18 is shorter than the second period of time 17, after a shorter while the newly added device will be taken into account when distributing the supplied power among the devices of the cluster such that the determined accumulated energy to be delivered to the cluster in function of time over the predetermined first period of time 16 will be substantially followed although it will not be strictly followed. The situation will be rectified when the second period of time 17 comes to an end and the newly added device will be incorporated into the determined accumulated energy to be delivered to the cluster in function of time over the predetermined first period of time 16.

The first 16, second 17 and third 18 period of time are illustrated in FIG. 4, showing an overview in function of time of the different periods of time.

To show the improvements which can be obtained with the method and the system according to the present invention a series of centralized benchmark solutions are presented: an agent-based embodiment of the method according to the present invention, an online centralized QP method having a finite horizon and a centralized offline QP with an infinite horizon. These centralized benchmark solutions can guarantee the best possible solution in terms of local and global objectives, but are limited in terms of scalability. The goal of this evaluation is to determine to which degree the method and/or system reaches the best possible solution in term of local and global objectives, while improving scalability.

The considered scenario is a fleet of PHEVs which have a grid connection available at their local distribution grid in a residential area. All PHEVs (plug-in hybrid electric vehicles) in this fleet are contracted by a fleet manager who wants to minimize the total energy costs of charging its fleet. A PHEV is a car with both an electric motor and a combustion engine, together with a battery that can be charged through a plug. Coordinated charging of electric vehicles in a Smart Grid is an important research topic, because PHEVs offer a tremendous opportunity for managing fluctuations in electricity generation and consumption.

1) Fleet manager: The (global) objective of the fleet manager is to minimize the charging costs of its fleet. The energy required for charging PHEVs is bought at the wholesale market. The costs made by charging PHEVs is described in an hourly-based cost model $C_h(E_h)$.

2) PHEV owner: The (local) objective of PHEV owners is to charge their vehicle before departure. Consequently, PHEV owners provide their departure time when arriving at home. The prediction of PHEV driving behavior is based on a statistical availability model [17]. This model represents the state of a car (home, driving, work, other) on a per minute base. Furthermore, to represent a realistic PHEV, the CHEVROLET VOLT (manufactured by GENERAL MOTORS) is chosen. This relative modern PHEV went in production at the end of 2010.

The energy cost model is based on the cost function $C_h(E_h)$ which represents the cost for generation or distribution of electricity at each hour h and is based on a quadratic cost function for thermal generators:

$$C_h(E_h) = a_h E^2_h + b_h E_h + c_h$$

where:
$a_h$ is the wholesale price of electricity
$E_h$ is the load of the whole fleet
$b_h$ and $c_h$ are assumed 0 for simplicity The hourly wholesale prices are used from the Belgian power exchange platform Belpex for the year 2010. The typical shape of the daily prices are low prices during the night and high prices during the evening.

To evaluate our agent-based method and/or system according to the invention in the described scenario, two centralized benchmark solutions are defined. Both these solutions are based on QP (Quadratic Programming) to optimize towards the quadratic cost function. The first benchmark is an online QP solution. Instead of aggregating PHEV flexibility, the online solution uses flexibility information from individual PHEVs to schedule their energy usage. The second benchmark is an offline QP solution which creates an offline schedule based on the complete and exact flexibility information of all PHEVs in the future. The global objective function for the agent-based method and/or system according to the invention and benchmark solutions:

$$cost_{total} = \sum_{t=0}^{t_{horizon}} C_h(E_h)$$

where:
$t_{horizon}$ is the optimization horizon. (limited to $t_{depart}$ for the solution according to the invention and online QP solution, unlimited for the offline QP solution)
$E_h$ is the energy charged in hour h by the whole fleet.
$C_h$ is the energy cost model.
Power operating limits of a local household and in-time charging of PHEVs are integrated as constraints.

Next the agent-based approach according to the invention is benchmarked in terms of optimization of local, or short term, and more global, or long term, objectives. In our scenario, the more global objective is to minimize charging costs and the local objectives are to charge PHEVs sufficiently before departure. If no information is available about driving times of a PHEV (method according to the invention and online benchmark), PHEVs are charged as much as possible, given the power limitations of their household connection. If information about driving times is available (offline benchmark), PHEVs are charged to maximize their electric driving time.

The total charging costs are assessed in a simulation of a scenario with 100 cars during 31 days. Each solution is simulated 100 times with different drive cycles for each car. The distribution of the total cost for each solution was plotted in a histogram. It was found that on the right end of the histogram uncontrolled charging was situated, because most cars arrive in the evening and start charging during the highest prices. On the left end of the histogram was situated the offline benchmark, yielding the lowest charging costs due to an infinite optimization horizon.

The difference between the results of the offline and online solutions is called the "online gap". This gap is inherent to the fact that an online solution has a limited view in the future, while the offline solution can optimize within an infinite-time horizon. In the results of the offline benchmark solution is seen that during weekdays, PHEVs are charged just enough to drive electrically. In contrary, during weekends, PHEVs are fully charged to benefit from the typically lower electricity prices. In a real setting, this solution is undesirable because PHEV owners do not exactly know their driving times beforehand.

The total charging costs of the agent-based MPC approach and the online benchmark are similar. While the offline benchmark has all information and uncontrolled charging none, the online benchmark has exactly the same amount of information as the agent-based MPC approach. The only difference is that the online benchmark individually schedules PHEVs, while the agent-based method and/or system according to the invention approach uses a three-step coordination mechanism. On average, the online benchmark outperformed the approach according to the invention with 1.5% less total charging costs. This difference was analyzed in a typical simulation run of a single day. During this day, the online benchmark outperformed the agent-based MPC solution with 1.4%. This difference according to the inventors seems a direct result of a suboptimal division of the obtained energy from the grid between the PHEVs. While the priority scheme employed to distribute the obtained power among the devices in the according to the invention doesn't ensure a perfect division between PHEVs like the online benchmark, a close approximation is nevertheless achieved by weighing between departure time, required energy and maximum charge power of PHEVs.

In a subsequent part of the evaluation, the scalability of the agentbased approach according to the invention is benchmarked by comparing the execution time of the agent-based approach according to the invention with the online QP solution using a computer. Because the PHEV scheduling problem can be defined as a convex optimization problem, execution time of the QP solution is known to be bounded by a polynomial. In the proceeding experiments, this polynomial is estimated and compared to the time complexity of the MPC approach.

The input to a PHEV scheduling problem, which indicates the scale of the problem, is defined by the number of cars (vertical scalability) and the length of their scheduling horizon (horizontal scalability):

1) Vertical scalability: To evaluate vertical scalability of the agent-based MPC approach, 10,000 to 100,000 cars are scheduled within a horizon of 144 time slots (e.g. one day for time slots of 10 minutes). Each simulation is repeated 10 times with different PHEVs. Results show that the execution time of the agent-based method according to the invention is constant, while the centralized solution scales as a 3rd order polynomial.

2) Horizontal scalability: To evaluate horizontal scalability of the agent-based MPC approach according to the invention, 50,000 cars are scheduled within a growing scheduling horizon from 10 to 140 time slots. Each simulation is repeated 10 times with different PHEVs. The results show that the execution time of the agent-based MPC solution scales linearly, while the centralized solution scales as a 5th order polynomial.

In summary, the agent-based solution according to the invention ensures a constant execution times in terms of vertical scalability due to an optimization independent of the PHEV fleet size and a linear execution time in terms of horizontal scalability. For both directions of scalability, the online benchmark calculates a solution several magnitudes slower than the solution according to the invention, with polynomial time complexity.

The invention claimed is:

1. A method implemented by a computer for distributing an energy flow over a predetermined period of time to a cluster of a plurality of devices, the method comprising the steps of:
(A) by the computer, aggregating flexibility information for the cluster forming a first aggregation path by gathering flexibility information of the respective devices in the cluster, the flexibility information of the respective devices comprising information on an energy already available to the respective devices, a minimal amount of accumulated energy in function of time needed and a maximal amount of accumulated energy allowed by the respective devices of the cluster within the predetermined period of time in function of time and a minimal and a maximal amount of power intake allowed by the devices, and combining the gathered flexibility information of the respective devices of the cluster into aggregate flexibility information for the cluster, the aggregate flexibility information of the cluster comprising information on an energy already available to each cluster, a minimal amount of accumulated energy in function of time needed and a maximal amount of accumulated energy in function of time allowed by the cluster, within the predetermined period of time in function of time,
(B) by the computer, determining accumulated energy to be delivered to the cluster in function of time over the predetermined period of time taking into account the aggregate flexibility information for the cluster,
(C) supplying the determined accumulated energy to the cluster by obtaining, from a supply of energy, power to be supplied to the cluster in function of time based on the determined accumulated energy to be delivered in function of time, and determining for each device in the cluster a priority for power in function of time to be supplied, wherein when more power is required by the device, a lower priority is provided, wherein the respective priorities for power to be supplied to the respective devices are combined into an aggregate priority for power to be supplied to the cluster forming a second aggregation path, and distributing, in function of time, power to be supplied to the devices of the cluster based on the priority for power to be supplied of the respective devices of the cluster from the second aggregation path and the aggregate for power to be supplied to the cluster from the first aggregation path.

2. The method for distributing an energy flow according to claim 1, wherein the priority for power to be supplied based on the flexibility information of the respective devices for the respective devices is determined as power in function of priority such that minimal priority corresponds to the maximal amount of power intake allowed by the respective device and maximal priority corresponds to the minimal amount of power intake allowed by the respective device, the relation between power and priority being indicative of the minimal amount of energy needed by the device in the predetermined amount of time and the relation between power and priority changing in function of time.

3. The method for distributing an energy flow according to claim 2, wherein, using the aggregate priority for power to be supplied, the priority corresponding to the power to be supplied from the supply of energy is obtained for the cluster, after which, based on the obtained priority for the cluster, using the respective priorities for power to be supplied in function of priority for the respective devices, the power to be supplied for the respective devices is determined and distributed to the devices of the cluster.

4. The method for distributing an energy flow according to claim 3, wherein a priority to use the power from the supply of energy is determined by subtracting an aggregate power in function of priority from the power obtained from the supply of energy in function of priority and determining from resulting power in function of priority, the priority with a power substantially closest to zero.

5. The method for distributing an energy flow over a first predetermined period of time to a cluster of a plurality of devices according to claim 1, wherein the steps (A)-(C) for distributing the energy flow are repeated every second predetermined period of time, wherein the second period of time is smaller than a first predetermined period of time.

6. The method for distributing an energy flow according to claim 5, wherein the priority for power to be supplied for the respective devices is determined after a third predetermined period of time.

7. The method for distributing an energy flow according to claim 1, wherein combining the flexibility information of the devices of the cluster into flexibility information for the cluster comprises adding the minimal amount of accumulated energy in function of time needed by the respective devices, adding the maximal amount of accumulated energy in function of time allowed by the respective devices, adding the minimal amount of power in function of time of the respective devices and adding the maximal amount of power in function of time of the respective devices.

8. The method for distributing an energy flow according to claim 1, wherein flexibility information is stored in at least one of the devices of the cluster.

9. The method for distributing an energy flow according to claim 8, wherein the flexibility information of at least one of the devices of the cluster is obtained by monitoring use of energy in function of time of the at least one device.

10. The method for distributing an energy flow according to claim 1, wherein a constraint relating to energy to be supplied comprises the availability of the energy for the supply of energy.

11. The method for distributing an energy flow according to claim 1, wherein the determination of the accumulated energy to be delivered in function of time over the predetermined period of time is done using any one of linear programming and stochastic, and dynamic, programming.

12. A non-transitory storage device on which a computer program is stored in a computer readable format, comprising the software components for performing the method according to claim 1.

13. A system comprising:
a cluster including a plurality of devices;
an aggregator configured to distribute an energy flow over a predetermined period of time to the cluster, wherein the aggregator is configured to:
A. aggregate flexibility information for the cluster forming a first aggregation path by gathering flexibility information of the respective devices in the cluster, the flexibility information of the respective devices comprising information on energy already available to the respective devices, a minimal amount of accumulated energy in function of time needed and a maximal amount of accumulated energy allowed by the respective devices of the cluster within the predetermined period of time in function of time and a minimal and a maximal amount of power intake allowed by the devices, and combining the gathered flexibility information of the respective devices of the cluster into aggregate flexibility information for the cluster, the aggregate flexibility information of the cluster comprising information on energy already available to the cluster, a minimal amount of accumulated energy in function of time needed and a maximal amount of accumulated energy in function of time allowed by the cluster, within the predetermined period of time in function of time and on a minimal and a maximal amount of power intake allowed by the cluster in function of time, B. determine accumulated energy to be delivered to the cluster in function of time over the predetermined period of time taking into account the aggregate flexibility information for the cluster, and C. supply the determined accumulated energy to the cluster by obtaining, from a supply of energy, power to be supplied to the cluster in function of time based on the determined accumulated energy to be delivered in function of time, and determining for each device in the cluster a priority for power in function to time to be supplied, wherein when more power is required by the device, a lower priority is provided, wherein the respective priorities for power to be supplied to the respective devices are combined into an aggregate priority for power to be supplied to the cluster forming a second aggregation path, and distributing, in function of time, power to be supplied to the devices of the cluster based on the priority for power to be supplied respective of the devices of the cluster from the second aggregation path.

14. The system of claim 13, wherein said system is configured to determine priority for power to be supplied based on the flexibility information of the respective devices by determining as power in function of priority such that minimal priority corresponds to the maximal amount of power intake allowed by the respective device and maximal priority corresponds to the minimal amount of power intake allowed by the respective device, the relation between power and priority being indicative of the minimal amount of energy needed by the device in the predetermined amount of time and the relation between power and priority changing in function of time.

15. The system according to claim 14, further comprising means for using the aggregate priority for power to be supplied, means for obtaining the priority corresponding to the power to be supplied from the supply of energy for the cluster, and means for using, based on the priority for the cluster, the respective priorities for power to be supplied in function of priority for the respective devices, the power to be supplied for the respective devices being determined and distributed to the devices of the cluster.

16. The system according to claim 15, wherein said system is configured to determine the priority to use the power from the supply of energy by subtracting the aggregate power in function of priority from the power from the supply of energy in function of priority and determining from resulting power in function of priority; the priority with a power substantially closest to zero.

17. The system according to claim 15, wherein the aggregator is a computer.

* * * * *